HIGH SPEED THIN FILM SWITCH

Filed Nov. 26, 1963 2 Sheets-Sheet 1

INVENTOR
PHILIPP G. KORNREICH

BY G. Donald Weber, Jr.
AGENT

March 17, 1970 P. G. KORNREICH 3,501,753

HIGH SPEED THIN FILM SWITCH

Filed Nov. 26, 1963 2 Sheets-Sheet 2

United States Patent Office 3,501,753

Patented Mar. 17, 1970

3,501,753
HIGH SPEED THIN FILM SWITCH

Philipp G. Kornreich, Westmont, N.J., assignor to Sperry Rand Corporation, New York, N.Y., a corporation of Delaware Filed Nov. 26, 1963, Ser. No. 326,060
Int. Cl. G11c 5/02, 11/14; H03k 17/84
U.S. Cl. 340—174 18 Claims

ABSTRACT OF THE DISCLOSURE

There is disclosed a switch comprising two transmission line elements with a thin magnetic film having the property of uniaxial anisotropy interposed as a spacer between the two elements. The first transmission line is made the input and the second line is made the output. The coupling between the two lines is made variable by causing the film to operate in its saturated or non-saturated mode.

This invention relates to a high speed switch. More particularly, the switch comprises a transmission line element having a thin magnetic film included in the spacer between the transmission line wires. The magnetic state of the thin film and, therefore, the operation of the switch is controlled by coincident current techniques.

There are many instances where high speed switching devices are necessary in electronic circuitry. For example, electronic data processing equipment and the like has many applications of high speed switching circuits and devices. Furthermore, since many of these circuits utilize thin magnetic films and/or other types of printed, etched or the like circuits, it is desirable to use high speed switching devices which are compatible with this type of arrangement. In the instant switching device, a transmission line coupling between input and output circuits is provided. Included in the spacer between the transmission lines is a thin magnetic film which exhibits uniaxial anisotropy. A magnetic field is applied to the magnetic film in order to produce certain predetermined initial magnetic characteristics therein. In addition, control conductors are disposed adjacent to each of the switching devices such that additional magnetic fields may be applied to the magnetic film in order to alter the magnetic field applied initially. The alteration in the magnetic field applied to the thin film produces a change in the magnetic characteristics thereof such that selective electrical coupling and decoupling exists between the transmission line wires or conductors.

Thus, an object of this invention is to provide a switching device which is simple in construction and relatively rapid in operation.

Another object of this invention is to provide a switching device which is used to selectively connect any one of a plurality of inputs with any one of a plurality of outputs.

Another object of this invention is to provide a high speed switching device using a thing magnetic film as an active element thereof.

Another object of this invention is to provide a switching device in the form of a matrix of switching elements which are controlled by coincident current techniques.

Another object of this invention is to provide a high speed switching device for alternating input signals.

These and other objects and advantages of this invention will become more readily apparent from the following description when read in conjunction with the accompanying drawings, in which.

Figure 1:
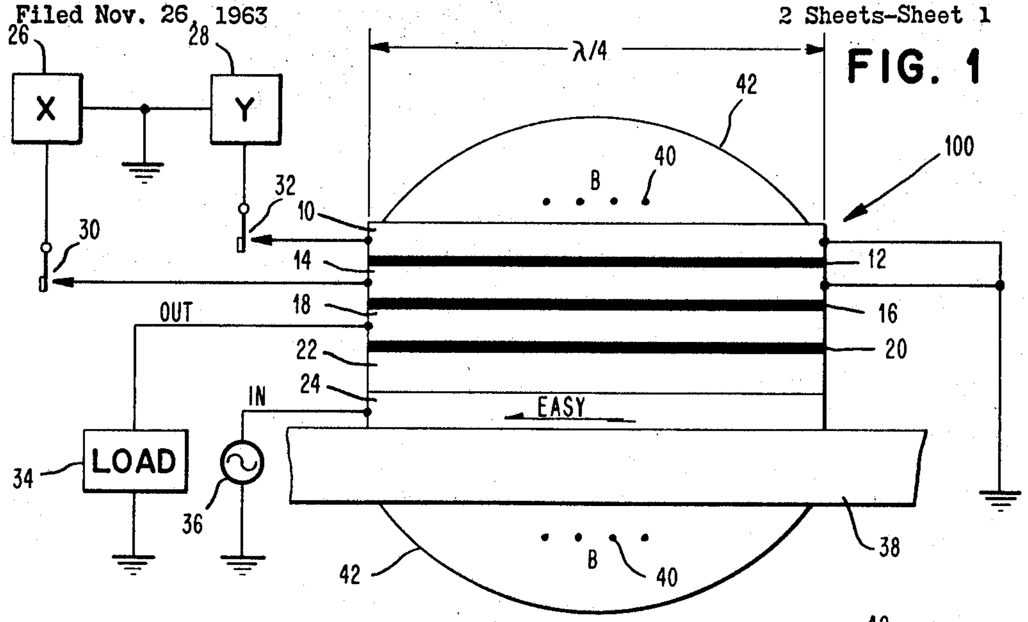
FIGURE 1 is an enlarged cross-sectional view of a schematic diagram of one embodiment of the instant switching device.

Referring now to FIGURE 1, there is shown a schematic diagram of a preferred embodiment of the instant switching device. The switching device is mounted on a base or support member 38. This support member, which may actually be eliminated if the individual elements are sufficiently sturdy, may be fabricated of any desirable material such as epoxy-glass, or any other material utilized in the art. Disposed upon support member 38, by any of the known methods, as for example etching, plating or the like, is a first conductor 24. Conductor 24 may be fabricated of any electrically conductive material, for example copper or silver. One end of conductor 24 is connected to input signal supplying source 36. Supply source 36 may be any conventional type of signal supplying source which provides an alternating signal, as for example a sinusoidal signal. The signal generator 36 is not limited in the frequency of operation thereof; however, carrier frequencies on the order of 50 to 500 megacycles per second to which the line is matched are typical. The signals supplied by source 36 may typically have a magnitude of approximately 1.00 volt peak-to-peak and are referenced to ground.

The length of the conductor 24 which is connected to the input source 36 is an important dimension. That is, the length of the input conductor 24 is defined to be equal to one quarter of a wavelength ($\lambda/4$) of the input signal in the line. The thickness of the conductor 24 may be on the order of 40,000 to 60,000 angstroms, and is usually approximately equal to the skin depth of the conductor material at the input signal frequency.

Disposed adjacent to conductor 24 is a magnetic film or layer 22. This magnetic layer may be any type of magnetic film or material which exhibits a uniaxial anisotropy including the typical magnetic material comprised of 80% nickel and 20% iron. The uniaxial anisotropy of the film permits the film to exhibit different hysteresis characteristics when subjected to magnetic fields and observed in different directions. That is, when a magnetic field is applied to the magnetic film in the EASY magnetization direction, i.e., along the EASY axis of the film which is shown by the arrow, the hysteresis characteristic observed for the film is the usual open and substantially rectangular characteristic. On the contrary, when the magnetic field is applied to the magnetic film along the HARD axis (perpendicular to the plane of the drawing) the hysteresis characteristic observed is a substantially linear, or closed, loop having positive and negative regions of saturation connected together by a substantially linear unsaturated region and exhibiting substantially no remanence. When the film is operating in the saturated region, the permeability ($\mu$) thereof is approximately equal to the permeability of air. On the other hand, when the film is operating in the unsaturated region, the permeability thereof is a function of the slope of the hysteresis characteristic and values in excess of 10,000 have been observed. Thus, the permeability of the thin film or magnetic layer varies greatly depending upon the condition of relative saturation thereof. This phenomenon is also an important characteristic of the switching device.

Disposed adjacent to the magnetic layer 22 is an insulation layer 20. The layer 20 which may be on the order of 2,000 to 5,000 angstroms thick may comprise any type of insulating material as for example SiO which is known in the art. Adjacent to the insulation layer 20 is conductor 18 which is similar to conductor 24, previously described. That is, conductor 18 may be fabricated of any electrically conductive material as for example copper or silver or the like and is on the order of 40,000 to 60,000 angstroms in thickness. Again, the length of conductor 18 is equal to $\lambda/4$ where $\lambda$ is defined as the wavelength, in the line, of the signal supplied by source 36. The terminal of conductor 18 adjacent to the source-connected terminal of conductor 24 is connected to one terminal of load 34. To provide a continuous circuit path, load 34 is returned to a suitable reference potential, for example ground. In relating conductor 24 to conductor 18, it may be noted that conductor 24 may be described as the input conductor and conductor 18 may be noted as the output conductor of the transmission line switching device. That is, the input signal supplied by source 36 is applied to the input conductor 24. The output signal is selectively supplied to load 34 by output conductor 18. The output conductor 18 which is identical in length to the input conductor 24 forms a transmission line element therewith with a spacer therebetween which spacer comprises the insulation layer 20 and the magnetic layer 22. Because of the insulation layer 20, it is clear that direct electrical contact between the conductors 18 and 24 cannot occur. However, the "normal" coupling which exists between the conductors of a transmission line may occur. This coupling is variable in accordance with the characteristics of the transmission line as will be discussed in detail subsequently.

Disposed adjacent to output conductor 18 is insulation layer 16 which may be similar to the insulation layer 20 and is used to provide electrical isolation between conductor 18 and conductor 14 which is disposed adjacent to insulation layer 16. Conductor 14 may be fabricated similar to either of conductors 18 or 24. However, the length of conductor 14 is not critical as was the case in regard to conductors 18 and 24 and the length thereof may vary somewhat. However, for purposes of ease in preparation, if conductor 14 is affixed directly to the element comprising conductors 18 and 24, the length thereof will be identical thereto. Since it is contemplated that conductor 14 may be associated with a further support member (not shown) which is similar to support member 38, the length of the conductor 14 may be different from the length of conductors 18 and 24 without causing any serious problems in the operation of the circuit. As shown, one terminal of the conductor 14 is connected to a reference potential source, as for example ground, and another terminal thereof is connected to one terminal of switch 30. The other terminal of switch 30 is connected to the X co-ordinate signal source 26 which is connected to ground to provide a complete circuit path. Source 26 may be any conventional type of constant current source which is capable of supplying a current of sufficient magnitude through conductor 14 such that the line is saturated.

Insulation layer 12 is affixed to conductor 14 to provide electrical isolation thereof. Conductor 10 which is similar to conductor 14 is affixed to insulation layer 12. If, as suggested supra, separate support means are desirable to provide a separable switching device, conductor 10 may be affixed to a support member similar to support member 38. In this configuration, the transmission line conductor-pair comprising conductors 10 and 14 may be selectively removable from the control signal conductor-pair comprising conductors 18 and 24. However, in the embodiment shown, all of the conductors are affixed one-to-the-other and are all disposed on one surface of the support means 38.

Conductor 10, which as noted supra, is similar to conductor 14 has one terminal therof connected to a suitable reference potential, as for example ground, and another terminal thereof conected to one terminal of switch 32. Another terminal of switch 32 is connected to the Y co-ordinate signal supplying source 28 which is connected to ground in order to provide a complete circuit path. Sources 26 and 28 are identical in their operation insofar as applying signals to the device is concerned. As will become more readily apparent subsequently, the X and Y co-ordinate signal supplying sources 26 and 28 are provided in order that coincident current techniques may be utilized if a plurality of switching devices are arranged in a matrix. If only a single switching device is provided, the row and column groups are respectively comprised of only one device and the sources 26 and 28 supply the control signals for controlling the operation of the switching device.

Shown adjacent to both the top and the bottom of the schematically shown switching device of FIGURE 1 is a magnetic field B where the magnetic field lines are represented by the dots 40. This field may be applied by any type of magnetic device as for example an electromagnet or a permanent magnet or the like. For purposes of description, the field lines 40 are shown at both the bottom and the top of the figure but are to be understood to represent a uniform distribution of magnetic field lines which permeates the entire switching device. That is, the switching device may be considered to lie between the poles of a permanent magnet and in the field therebetween. The field lines 40, which are perpendicular to the plane of the diagram, are designed to be parallel to the HARD direction of the magnetic material 22 which direction is also defined as being perpendicular to and extending out of the plane of the diagram. It is to be understood, of course, that the field lines are produced by any conventional magnetic field producing means, as noted supra. For purposes of simplicity, only one pole 42 of a field producing magnet is schematically shown.

Figures 1A, 2, 3:
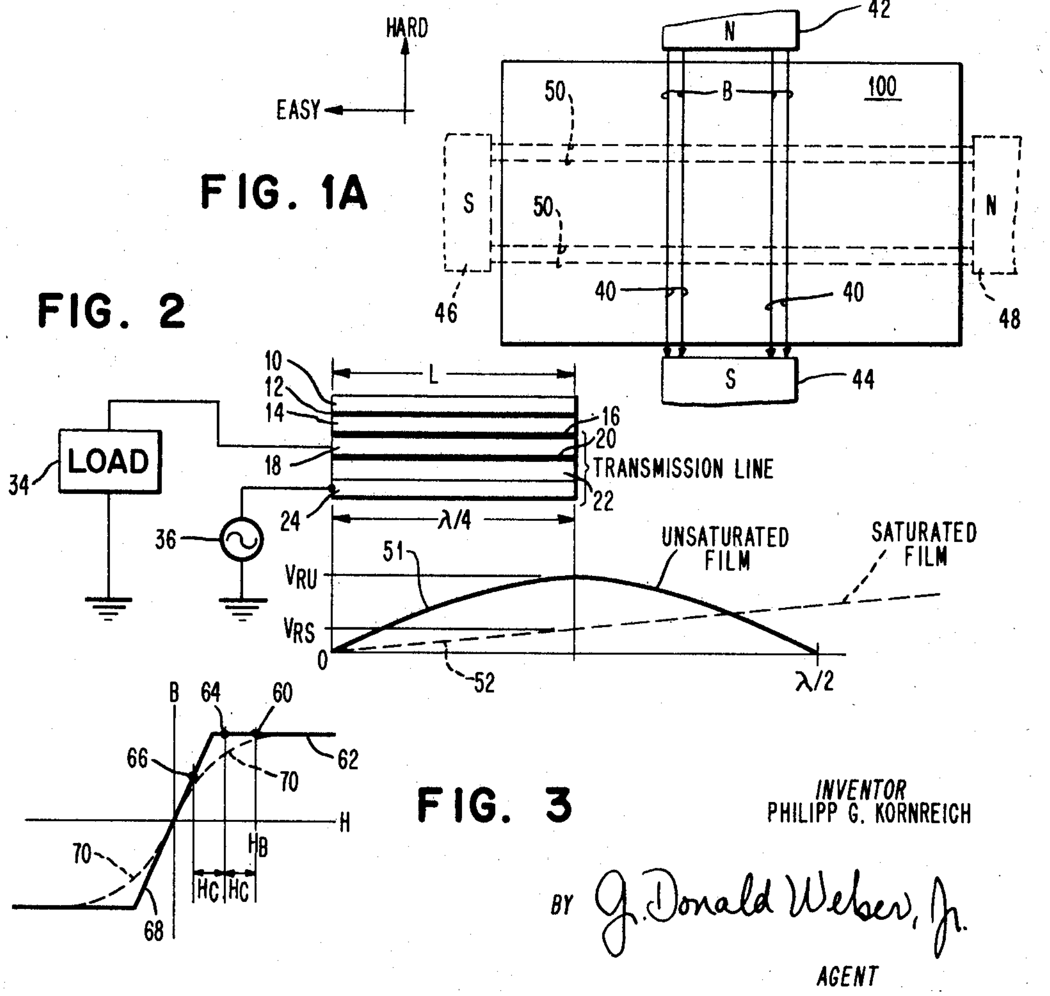
FIGURE 1A is a schematic diagram of the top view of the embodiment shown in FIGURE 1.
FIGURE 2 is a schematic representation of the voltage characteristic of a transmission line and the relationship between a transmission line element and the characteristic.
FIGURE 3 is a schematic representation of the hysteresis characteristic associated with the thin magnetic film.

Referring now to FIGURE 1A, there is schematically shown the top view of the embodiment shown in FIGURE 1. In FIGURE 1A, the switching device 100, is disposed between the magnet poles 42 and 44. The magnet poles may be the poles of a permanent magnet or an electromagnet or the like. The magnetic field 40 is created between poles 42 and 44 and uniformly permeates the switching device 100. The magnetic field 40 is applied parallel to the HARD magnetization direction of the magnetic layer of the switching device. For purposes of completeness, additional magnet poles 46 and 48 are shown in dashed outline. These latter magnet poles may be utilized in some embodiments for providing greater control of the operation of the device. That is, these poles produce magnetic field 50 which is applied parallel to the EASY magnetization direction of the magnetic layer. Therefore, by proper control of the fields applied perpendicular to each other, the cumulative effect on the magnetic layer may be varied somewhat. Thus, although poles 46 and 48 are not required, they may be desirable in certain applications.

Referring now to FIGURE 2, there is shown a schematic diagram of the transmission line element portion of the device shown in FIGURE 1 and the voltage characteristic between the wires of the transmission line. Thus, the source 36 is connected to conductor 24 and load 34 is connected to conductor 18. The conductors are spaced apart by the insulating layer 20 and the magnetizable layer 22. The length, L, of the transmission line element is projected onto the voltage characteristic shown in FIGURE 2. The voltage characteristic shows the voltage magnitude between wires of an open-end transmission line element. As is well known, in an open ended transmission line the magnitude of the voltage reflected by the open end is a function of the magnitude of the signal applied at the generator or source end of the transmission line element and the wavelength, $\lambda$, of the signal applied to the transmission line. The effective wavelength of the signal applied to the transmission line may be altered by changing either the frequency of the applied signal or the operating characteristics of the transmission line. The latter method is proposed in this device so that the input signals may be maintained at a constant frequency. The variation in the effective length of the transmission line causes a modification of the potential applied at the open end thereof. The curves 51 and 52 shown in FIGURE 2 are illustrative of the variations in potential which may be obtained by varying the operating characteristics of the transmission line element.

It is well known in transmission line theory that $$\lambda \frac{V}{f}$$

and $$V = 1/\sqrt{\mu\epsilon}$$

By combining these equations, it may be shown that $$\lambda = 1/f\sqrt{\mu\epsilon}$$

By holding the frequency, $f$, of the input signal constant thereby insuring that the dielectric constant, $\epsilon$, of the insulation layer retains a constant value, the equation may be rewritten as $$\lambda = \left(\frac{1}{f\sqrt{\epsilon}}\right)\left(\frac{1}{\sqrt{\mu}}\right)$$

Therefore, since $f$ and $\epsilon$ are constant values, $\lambda$ may be shown to be a function of the permeability, $\mu$, of the spacer between the transmission line wires. That is, $$\lambda = \frac{K}{\sqrt{\mu}}$$

Therefore, it is obvious that a variation in the value of $\mu$ produces a variation in the value of $\lambda$. As noted supra, the value of $\mu$ for the magnetic layer 22 in the transmission line element may vary between values of approximately 1.00 at saturation and 10,000 or more in the unsaturated region. Therefore, the value of $\lambda$ may vary by a factor of over 100. Thus, as shown in the diagram in FIGURE 2, the curve 51 (solid line) represents the voltage between the transmission line wires 18 and 24 when the magnetic film or layer 22 is in the unsaturated state. On the other hand, the dashed line 52 shows the voltage between the wires 18 and 24 with the magnetic layer 22 in the saturated condition. That is, because the value of $\mu$ of the transmission line varies greatly between the saturated and unsaturated operating conditions of the magnetic film, the effective length L of the transmission line varies. As an alternative to this effect, it may be considered that the magnitude of $\lambda$ varies. Obviously, as either L or $\lambda$ varies, the magnitude of the reflected voltage varies. In other words, the input signal supplied by source 36 has a substnatially fixed frequency and peak magnitude. If it is considered that the actual length of the transmission line remains constant and the wavelength changes in relation thereto, a different point of the signal is applied to the open-end of the transmission line and reflected to the source end thereof. Consequently, since the transmission line has a length equal to $\lambda/4$ of the input signal when the magnetic layer 22 is in the unsaturated region (and the value of $\mu$ is high), the input signal is at its maximum potential at the open end of the transmission line. Therefore, this maximum potential is reflected back to the source end of the line 180° out of phase with the input signal such that there is zero potential difference between conductors 18 and 24 of the transmission line. Thus, the input signal supplied by source 36 is effectively supplied by the load 34. On the other hand, when the magnetic layer 22 is saturated, the magnitude of $\mu$ is greatly decreased such that the magnitude of $\lambda$ is greatly increased. Therefore, the transmission line element appears, electrically, to be a very short element relative to the wavelength of the applied signal whereby only a very small portion of the potential exists at the end of the transmission line element. That is, as shown by dashed line 52 in FIGURE 2, the input signal has not achieved its maximum value but has achieved only a low poential value represented by the leading slope of the input signal. Therefore, only this small potential (which is exaggerated for clarity) is reflected back to the source end of the line 180° out of phase with the input signal so that a large potential difference exists between the conductors 18 and 24 and the input source 36 is effectively isolated from the output load 34. The potential difference between the conductors 18 and 24 may be graphically represented as the potential difference represented by $V_{RU}-V_{RS}$. This potential difference is significant in any case where the value of $\lambda$ when layer 22 is saturated is much greater than the value of $\lambda$ when layer 22 is unsaturated. In fact, for very great values of $\lambda$ when the film is saturated, the potential difference between conductors 18 and 24 is substantially equivalent to the maximum magnitude of the input signal since the reflected potential, $V_{RS}$, is very small and approaches zero volts.

Relating now the description and discussion of FIGURES 1 and 2 with the hysteresis characteristic shown in FIGURE 3, it will be seen that a controllable switching device may be provided. Thus, the input signal is supplied by source 36 to conductor 24. A magnetic field 40 is supplied parallel to the HARD direction of the magnetic film 22 by the magnet comprising poles 42 and 44 and the hysteresis characteristic shown in FIGURE 3 is observed. The field 40 is of such magnitude that the magnetic film 22 is biased to operating point 60 in the saturated region 62 and exhibits a $\mu$ of one. This value of $\mu$ renders the value of $\lambda$ for the input signal very large in magnitude. Therefore, the transmission line comprising conductors 18 and 24 appears as a very short transmission line (relative to the wavelength of the input signal) and the potential at the open end of the transmission line comprising conductors 24 and 18 is very small. This signal, when reflected to the generator end of the transmission line, remains small so that the potential difference between the generator ends of conductors 18 and 24 is large. Therefore, load 34 is effectively insulated or isolated from the input source 36.

The closure of either of switches 30 or 32 produces current flow through the conductor 14 or 10 which is associated with the closed switch. This current produces a magnetic field, called a control field, which is defined to be oppositely directed, in the magnetic film 22, to the bias field 40. However, the control field produced by current flow through either one of conductors 10 or 14 is smaller than the bias field initially applied to the film by the magnet poles 42 and 44. With one control field applied, the film operates at point 64 in the saturated region 62. However, when both switches 30 and 32 are closed, current exists in both conductors 10 and 14. These currents produce magnetic fields around conductors 10 and 14 respectively. These control fields are both oppositely directed to the field 40 in the magnetic film 22. Furthermore, the cumulative or total control field produced by simultaneous current flow through both conductors 10 and 14 is defined to be such that the magnetic film 22 is now operating at point 66 in the unsaturated region 68. That is, the effect of the saturating bias field 40 is sufficiently reduced or overcome by the cumulative field produced by current flow in conductors 10 and 14 that magnetic layer or film 22 is no longer in its saturated magnetic condition. When the film is in the unsaturated region 68, the value of $\mu$ is greatly increased (for example, to 10,000 or more) whereby the value of $\lambda$ is greatly decreased. The value of $\lambda$ which exists when the film is in the unsaturated region is such that the transmission line conductors 18 and 24 are equivalent in length to a quarter wavelength, $\lambda/4$, of the input signal supplied by source 36. Thus, the signal supplied by source 36 achieves the maximum value at the open end of conductors 18 and 24. This maximum signal value is reflected back to the generator ends of the conductors 18 and 24 such that the potential difference therebetween is substantially zero whereby the input source 36 is, effectively, electrically connected to output load 34.

Thus, in accordance with coincident current techniques, the application of a current signal to one or the other of conductors 10 or 14 is insufficient to produce a magnetic field of large enough magnitude to cause switching of the circuit. However, the coincident application of current signals to both control conductors is sufficient to produce a magnetic field of such strength that the bias field 40 is overcome and an electrical connection or coupling is provided between the input and the output devices, namely, source 36 and load 34. Thus, by controlling the application of the currents supplied by sources 26 and 28, the switching or interconnection between the input and the output sources is readily controllable.

Figure 4:
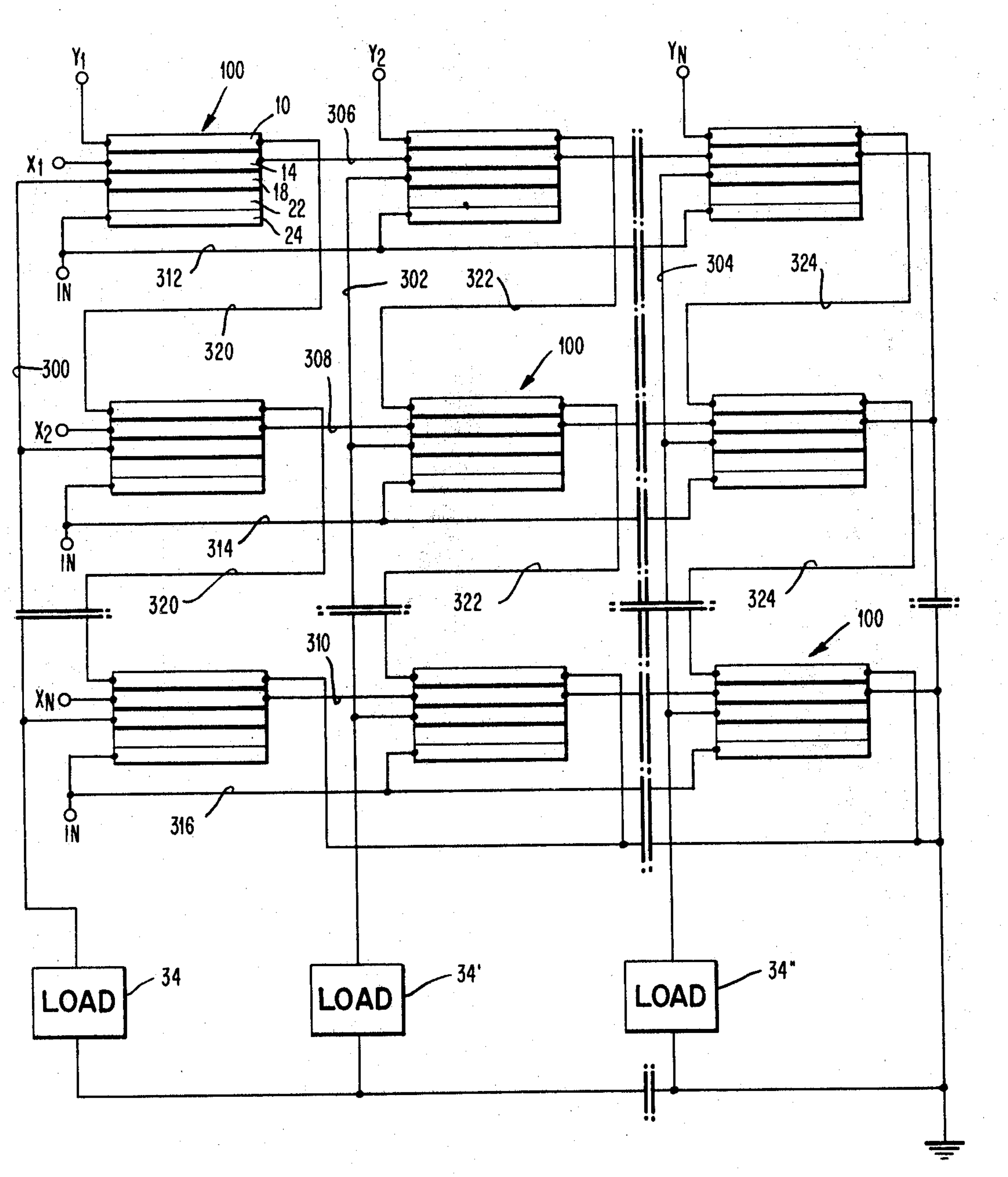
FIGURE 4 is a schematic diagram of a matrix arrangement of a plurality of switching devices.

Referring now to FIGURE 4, there are shown a plurality of switching devices 100 arranged in a matrix array. Each of the switching devices 100 is similar to the switching device 100 shown in FIGURE 1 and described supra. Although a three-by-three matrix is shown, it is understood that more, or fewer, switching devices may be utilized. Moreover, a square array is not required and a single row or column of switching devices may be utilized. However, a square array is shown for convenience and completeness. It is to be understood that magnetic field applying means similar to magnetic poles 42 and 44 (see FIGURE 1A) apply a uniform bias field to each of the switching devices 100. This bias field insures that each of the switching devices is disabled such that the inputs and outputs are electrically isolated.

In accordance with typical matrix arrays which use coincident current techniques, all of the conductors 10 of all of the switching devices 100 in any column (vertical array) are connected together. For example, in the first column, all of the conductors 10 are connected together by the wire 320 to form a series circuit. One end of the series circuit is connected to the terminal $Y_1$ which is connected to a source similar to source 28 shown in FIGURE 1. The other end of the series circuit containing conductors 10 is connected to a suitable reference potential, for example ground. Likewise, the conductors 10 in the switching devices 100 which form the second column are connected in series by the wire 322. One end of this series circuit is connected to ground and the other end of the circuit is connected to terminal $Y_2$. Terminal $Y_2$ is connected to another source similar to source 28. Finally, terminal $Y_N$ which is connected to another source similar to source 28, is connected to one end of the series circuit which comprises all of the conductors 10 in the Nth column of devices 100. These conductors 10 are connected together by the wire 324 which is connected to ground as are the other series circuits.

Furthermore, the conductors 14 of each of the switching devices 100 in any particular row (horizontal array) are connected together in series. For example, the conductors 14 in the first row of switching devices 100 are connected together in series by the wire 306. One terminal of this series network is connected to ground and another terminal is connected to terminal $X_1$. Terminal $X_1$ is connected to a source similar to source 26 shown in FIGURE 1. Again, terminal $X_2$ is connected to a source similar to source 26 and is also connected to the series circuit comprising the conductors 14 in the second row of switching devices 100 which conductors 14 are connected together by wire 308. The other end of this series circuit is connected to the reference potential, ground. Finally, in the Nth row of switching devices 100, the conductors 14 are connected in series by the wire 310. One end of this series circuit is connected to ground and the other end of the series circuit is connected to terminal $X_N$. Terminal $X_N$ is connected to a source similar to source 26.

The output conductors 18 are connected together, in parallel, in columnar form like the Y conductors 10. Thus, in the first column the output conductors 18 each have one end thereof connected together by the wire 300 which is connected to the load 34. Load 34 is also connected to ground for reference purposes. Likewise, the output conductors 18 in the second column are connected together by the wire 302 and connected to load 34' which is referenced to ground potential. Also, in the Nth column the output conductors 18 are connected together by the wire 304 which is connected to the load 34'' which is also referenced to ground.

The input conductors 24 are connected, in parallel, in accordance with the row arrangement of switching devices 100. Thus, the input terminal for each of the input conductor circuits is connected to a separate input source similar to source 36 shown in FIGURE 1. The input conductors 24 are connected together by wire 312 in the first row, by wire 314 in the second row, and by wire 316 in the Nth row.

This interconnection of the plurality of switching devices 100 permits the interconnection of any one of the plurality of inputs to any one of the plurality of outputs in accordance with the control exerted by coincident current techniques. That is, as noted supra, the biasing magnetic field is applied such that each of the magnetic films or layers 22 is in the saturated condition and exhibits a $\mu$ of 1. Thus, each of the transmission line elements appears as a very short transmission line element relative to the signals supplied by the input sources whereby the input and output conductors are electrically isolated. However, through the application of a control current to at least one of the Y conductors and at least one of the X conductors, at least one of the switching devices 100 may be rendered operative. That is, the value of $\mu$ for the transmission line will be greatly increased inasmuch as the thin magnetic film 22 will be driven into the unsaturated region. For example, if a current is supplied by the source (similar to source 28) connected to terminal $Y_2$, a current flows through wire 322 and each of the series connected conductors 10 associated therewith. As noted supra, the magnetic field produced through the magnetic film 22 by the application of this current through conductor 10 is insufficient to drive the film from the saturated to the unsaturated condition. However, if a current is also supplied to terminal $X_N$, for example, by a source similar to source 26, then current flows in each of the conductors 14 which are connected by the wire 310. Once again, this single current supply does not produce a sufficiently large magnetic field in thin film 22 to drive the film into the unsaturated condition. Thus, it is obvious that the first and second switching devices in the second column receive only a single current supply as do the first and Nth switching devices in the Nth row. However, the second switching device 100 in the Nth row receives two supplies of current; one through conductor 10 and one through conductor 14. As noted supra, the cumulative magnetic field produced by the two currents is sufficiently large to drive the magnetic layer 22 from the saturated to the unsaturated condition. Since the layer 22 in the second switching device 100 in the Nth row is now unsaturated, the value of $\mu$ thereof approaches 10,000. In this condition, the characteristics of the transmission line portion of the switching device are varied such that the transmission line appears to have a length equal to $\lambda/4$ for the input signal. As noted supra, the input signal has achieved its maximum magnitude when it is reflected by the open-ended transmission line. This maximum magnitude of the potential is substantially identical to the magnitude of the potential which is applied by the input source whereupon the potential difference between conductors 18 and 24 is substantially zero. Thus, there is an effective electrical coupling between these conductors and any input supplied to the input terminal in the Nth row will be supplied to load 34' in the second column.

This illustrative description of the operation of the matrix network is not meant to be limitative of the invention, but rather is meant to be indicative of the type of operation which is possible with this circuit. Thus, an input may be applied to any one of the N input conductors and, by proper selection of the control currents supplied by the X and Y sources, the signal may be transferred to any of the N outputs, as desired.

Other embodiments of the device may be provided to perform or achieve desired results. For example, by selectively applying a magnetic field in the EASY direction of magnetization as well as in the HARD magnetization direction of film 22, the value of $\mu$ may be selectively varied. The dashed line 70, in FIGURE 3, is representative of the changes which are possible in the slope of the curve which is the value of $\mu$. This permits certain manufacturing freedom in producing the transmission line elements. For example, if the transmission line wires are slightly long, a field may be applied in the EASY direction simultaneously with the application of the HARD direction field in order to selectively vary the value of $\mu$ to compensate for the transmission line over-dimension. The control currents and fields are applied in the manner noted above to accomplish switching.

Other variations may be suggested to those skilled in the art. However, any variations or modifications which do not depart from the inventive principles described herein, are meant to be included in these teachings.

The embodiments of the invention in which an exclusive property or privilege is claimed are defined as follows:

1. A switching circuit comprising at least one switching element, said switching element including a thin magnetic film characterized by having saturated and unsaturated operating conditions, an input conductor, an output conductor, said input and said output conductors being disposed adjacent opposite surfaces of said thin magnetic film, means producing effective current flow between said input and output conductors, and said conductors being selectively linked together electromagnetically by providing said conductors with a specific electrical length with respect to the signal applied to said input conductor in accordance with the operating condition of said thin film, and at least one conductor disposed adjacent to said thin film for applying a magnetic field to said thin film to control the operating conditions thereof.

2. A switching circuit comprising at least one switching element, said switching element including a thin magnetic film characterized by having saturated and unsaturated operating conditions, an input conductor, an output conductor, said input and said output conductor being disposed adjacent opposite surfaces of said thin magnetic film such that said conductors may be selectively linked together electromagnetically by designing said conductors to have an electrical length of one-quarter wire length with respect to the signal applied to said input conductors to produce an effective current interchange therebetween when said thin film assumes its unsaturated operating condition, and control conductors disposed adjacent to said thin film for applying a magnetic field to said thin film to control the operating condition thereof.

3. In combination, input means for supplying an alternating input signal, output means, transmission line means including a pair of conductors, one of said conductors connected to said input means, another of said conductors connected to said output means, a thin magnetic film exhibiting uniaxial anisotropy disposed between said pair of conductors, an insulating layer disposed between said thin film and one conductor of said pair of conductors, means for supplying a biasing magnetic field switching element, said switching element including a thin magnetic film characterized by having saturated and unsaturated operating conditions, an input conductor, an output conductor, said input and said output conductors being disposed adjacent opposite surfaces of said thin magnetic film, means producing effective current flow between said input and output conductors, and said conductors being selectively linked together electromagnetically by providing said conductors with a specific electrical length with respect to the signal applied to said input conductor in accordance with the operating condition of said thin film, and at least one conductor disposed adjacent to said thin film for applying a magnetic field to said thin film to control the operating conditions thereof.

4. In combination, input means for supplying a high frequency input signal, output means, transmission line means including a pair of conductors, one of said conductors connected to said input means, another of said conductors connected to said output means, a thin magnetic film exhibiting uniaxial anisotropy disposed between said pair of conductors, means for supplying a biasing magnetic field to said thin film to cause said film to be magnetically saturated such that said film exhibits a low permeability and said input means and said output means are electrically isolated, first and second control conductors disposed adjacent to said transmission line means, and means for selectively supplying current signals to each of said control conductors such that a controlling magnetic field is produced therearound, said controlling magnetic field being of sufficient magnitude to overcome said biasing magnetic field and to change the relative saturation level of said thin magnetic field whereby the characteristics of said transmission line means may be changed only when current signals are supplied to each of said first and second control conductors simultaneously.

5. In combination, input means for supplying an alternating input signal, output means, transmission line means including a pair of conductors, one of said conductors connected to said input means, another of said conductors connected to said output means, a thin magnetic film exhibiting uniaxial anisotropy disposed between said pair of conductors, means for supplying a biasing magnetic field to said thin film such that said film is biased to magnetic saturation, said thin film exhibiting a low permeability when magnetically saturated such that the characteristics of the transmission line provide isolation between said input means and said output means, first and second control conductors disposed adjacent to said transmission line means, and separate means for selectively supplying current signals to each of said control conductors such that a controlling magnetic field is produced therearound, said controlling magnetic fields individually being insufficient to overcome said biasing magnetic field to change to relative saturation level of said thin magnetic film, said controlling magnetic fields cumulatively having a sufficient magnitude to overcome said biasing field to cause said thin film to be magnetically unsaturated, said thin film exhibiting a high permeability when unsaturated such that the characteristics of the transmission line provide coupling between said input means and said output means.

6. A switching current comprising a plurality of switching elements, each of said switching elements including a thin magnetic film characterized by having saturated and unsaturated operating conditions, a plurality of input conductors, a plurality of output conductors, different ones of said pluralities of input and output conductors being disposed adjacent opposite surfaces of different ones of said thin magnetic films, means selectively linking said input and output conductors together electromagnetically by providing said conductors with a specific electrical length with respect to the signal applied to said input conductor in accordance with the operating condition of said respective thin films, and at least one bias conductor disposed adjacent to each of said thin films for applying a bias field to said thin films to control the operating condition thereof.

7. A switching circuit comprising a pair of parallel electrical conductors forming a transmission line element, a thin magnetic film exhibiting uniaxial anisotropy and HARD and EASY magnetization directions, said magnectic film being disposed between said pair of electrical conductors to permit variation of the operating characteristics of said transmission line element, first means for supplying a bias magnetic field to said transmission line element to bias said thin magnetic film to a predetermined operating condition such that the operating characteristic of said transmission line element is determined, second means for selectively supplying a control magnetic field to said transmission line element in addition to said bias magnetic field such that the operating characteristic of said transmission line is varied, input means, and output means, each of said input means and said output means connected to a different one of said pair of parallel electrical conductors such that the coupling between said input means and said output means is dependent upon the operating characteristic of said transmission line element.

8. The switching circuit of claim 7 wherein the variation in the operating characteristic of the transmission line element is controlled by variations in the permeability of the thin magnetic film where the permeability is a function of the relative saturation level of said thin magnetic film.

9. A switching circuit comprising a pair of parallel electrical conductors forming a transmission line element, a thin magnetic film exhibiting uniaxial anisotropy and HARD and EASY magnetization directions, said thin film capable of being magnetically saturated or unsaturated, said magnetic film being disposed between said pair of electrical conductors to permit variation of the operating characteristics of said transmission line element in accordance with the relative saturation of said thin film, first means for supplying a bias magnetic field to said transmission line element to bias said thin magnetic film to a predetermined relative saturation condition such that the operating characteristic of said transmission line element is determined, second means for selectively supplying a control magnetic field to said transmission line element in addition to said bias magnetic field such that the relative saturation of said thin film is varied whereby the operating characteristic of said transmission line is varied, input means, and output means, each of said input means and said output means connected to a different one of said pair of parallel electrical conductors such that the coupling between said input means and said output means is dependent upon the operating characteristic of said transmission line element.

10. In combination, alternating signal supplying means, a pair of electrical conductors arranged to form a transmission line element having length substantially identical to a quarter wavelength of the supplied signal, one of said pair of electrical conductors connected to said signal supplying means, output means connected to the other of said pair of electrical conductors, a thin magnetic film disposed between said pair of electrical conductors, said magnetic film exhibiting uniaxial anisotropy and distinct operating regions of magnetic saturation and unsaturation, each of said distinct operating regions of said film producing different operating characteristics for said transmission line element, means for supplying a bias magnetic field to said thin film such that said thin film operates in the region of magnetic saturation whereby the transmission line element appears to be a substantially infinite impedance, and means for selectively supplying a control magnetic field to said thin film such that the effect of said bias magnetic field is reduced and said thin film operates in the region of magnetic unsaturation whereby the transmission line element appears to be substantially a short circuit such that said signal supplying means and said output means are effectively coupled together.

11. The combination recited in claim 10 wherein said control magnetic field supplying means include conductors adjacent to each of said transmission line elements, and current supplying means connected to said conductors for selectively supplying current therethrough in order to create a magnetic field therearound.

12. The combination recited in claim 11 wherein said control magnetic field supplying means provides a magnetic field which is oppositely directed relative to the field provided by said bias magnetic field supplying means.

13. The combination recited in claim 10 wherein a plurality of said transmission line elements are interconnected in a matrix-type array, each of said plurality of transmission line elements providing switching between separate signal supplying means and separate output means.

14. The combination recited in claim 13 wherein said control field supplying means include third and fourth electrical conductors linked to each of said transmission line elements, separate current supplying means connected to each of said third and fourth conductors for selectively supplying current therethrough in order to create a magnetic field therearound, said first and third conductors connected to form a plurality of rows, said second and fourth conductors connected to form a plurality of columns, said rows and columns being interrelated and arranged to form a matrix of switching devices.

15. In combination, means for supplying high frequency signals, first and second parallel electrical conductors arranged to form an open-ended transmission line element having length substantially identical to a quarter wavelength of the supplied signal, said first electrical conductor connected to said signal supplying means, output means connected to said second electrical conductor, a thin magnetic film disposed between said first and second electrical conductors such that signals supplied to said transmission line element achieve a relatively lossless hysteresis characteristic, said magnetic film exhibiting uniaxial anisotropy and distinct operating regions of magnetic saturation and unsaturation, each of said distinct operating regions of said film exhibiting different values of permeability and producing different operating characteristics for said transmisson line element, means for supplying a bias magnetic field to said thin film such that said thin film operates in the region of magnetic saturation whereby the transmission line element appears to be a substantially infinite impedance, and means for selectively supplying a control magnetic field to said thin film such that the effect of said bias magnetic field is reduced and said thin film operates in the region of magnetic unsaturation whereby the transmission line element appears to be substantially a short circuit such that said signal supplying means and said output means are effectively coupled together.

16. A switching circuit comprising a pair of parallel electrical conductors forming a transmission line element, a thin magnetic film exhibiting uniaxial anisotropy and HARD and EASY magnetization directions, said thin film capable of being magnetically saturated or unsaturated, said magnetic film being disposed between said pair of electrical conductors to permit variation of the operating characteristics of said transmission line element in accordance with the relative saturation of said thin film, means for supplying a constant bias magnetic field to said transmission line element to bias said thin magnetic film to a predetermined relative saturation condition such that the operating characteristic of said transmission line element is determined, means for selectively supplying a control magnetic field to said transmission line element in addition to said bias magnetic field such that the relative saturation of said thin film is varied whereby the operating characteristic of said transmission line is varied, input signal supplying means, and output means, each of said input signal supplying means and said output means connected to a different one of said pair of parallel electrical conductors such that the coupling between said input signal supplying means and said output means is dependent upon the operating characteristic of said transmission line element such that signals are selectively supplied from said input signal supplying means to said output means.

17. The switching circuit recited in claim 16 wherein said means for supplying a constant bias comprises a magnet disposed adjacent to said transmission line element.

18. The switching circuit recited in claim 17 wherein said magnet is an electromagnet.

References Cited

UNITED STATES PATENTS

| | | | |
|---|---|---|---|
| 3,286,241 | 11/1966 | Hasty et al. | 340—174 |
| 3,037,199 | 5/1962 | Grant | 340—174 |

BERNARD KONICK, Primary Examiner

S. B. POKOTILOW, Assistant Examiner

U.S. Cl. X.R.

307—88